United States Patent [19]
Gunning, III et al.

[11] Patent Number: 5,157,258
[45] Date of Patent: Oct. 20, 1992

[54] MULTICOLOR INFRARED FOCAL PLANE ARRAYS

[75] Inventors: William J. Gunning, III; Natalie S. Gluck, both of Newbury Park, Calif.

[73] Assignee: Rockwell International Corporation, Seal Beach, Calif.

[21] Appl. No.: 396,154

[22] Filed: Aug. 21, 1989

[51] Int. Cl.$^5$ .............................. G01J 1/02
[52] U.S. Cl. ..................... 250/339; 250/332
[58] Field of Search ................. 250/339, 332

[56] References Cited

U.S. PATENT DOCUMENTS

| | | | |
|---|---|---|---|
| 3,781,558 | 12/1973 | Anderson | 250/332 |
| 4,423,325 | 12/1983 | Foss | 250/332 |
| 4,596,930 | 6/1986 | Steil et al. | 250/332 |

*Primary Examiner*—Mark Hellner
*Attorney, Agent, or Firm*—John J. Deinken

[57] ABSTRACT

The multicolor focal plane array of this invention detects and distinguishes between incoming electromagnetic radiation within a first band of wavelengths and incoming electromagnetic radiation within a second band of wavelengths which includes the first wavelength band. The array includes a substrate and a two dimensional array of detectors disposed on the substrate and responsive to electromagnetic radiation within a predetermined range of wavelengths including the first and second wavelength bands. A first thin film filter is disposed on the substrate and interposed between the incoming radiation and a subset of the detectors in the array to prevent radiation outside of the first wavlength band from reaching the detectors. A second thin film filter is disposed on the substrate and interposed between the incoming radiation and all of the detectors in the array to prevent radiation outside of the second wavelength band from reaching the detectors in the subset. The filter design uses a double optimized approach that effectively reduces the thickness of the multilayer stack requiring lithographic patterning. A thickness of less than five microns is achieved which enables the use of a multilayer resist lift-off method. The detectors in the subset are thus made sensitive to wavelengths within the first wavelength band, while the remaining detectors are sensitive to wavelengths within both the first and second wavelength bands.

4 Claims, 8 Drawing Sheets

MULTICOLOR INFRARED FOCAL PLANE ARRAYS

BACKGROUND OF THE INVENTION

This invention is concerned with focal plane array technology for detecting incoming infrared electromagnetic radiation with a two dimensional array of detectors.

Many advanced optical sensors require spectral selectivity as part of the function of target detection and discrimination. In the infrared region, for example, various methods have been proposed to provide multicolor infrared detection, some making use of a complex detector architecture, others using spectral filtering methods. Multiple apertures, or the use of dichroic beamsplitters with separate focal planes, are among the optical solutions which have been devised. Alternatively, segmented filters are placed close to the focal plane. This last approach has the disadvantages of complicating the optical and mechanical design, increasing the cooling requirements, and introducing the possibility of spectral crosstalk. Current technology requires that such filters be deposited onto separate substrates because most optical thin films must be deposited onto heated substrates at temperatures well above the safe limits for HgCdTe infrared detectors, while filters deposited prior to detector formation must withstand subsequent processing procedures. Filters on separate substrates incur several system penalties. The filter is a separate component which must be cryogenically cooled, placing increased demands on system cooling capacity. In addition, multiple reflections can occur between the filter and the focal plane array, resulting in image degradation and spectral crosstalk. Another multicolor approach requires the use of a segmented focal plane with scanning capability to obtain accurate spatial as well as spectral information.

Spectral filter arrays are known in the art for visible wavelength applications. These filters consist of arrays of thin film interference filters, each color being determined by an independent filter design. The methods used to fabricate such a filter directly on a detector array cannot be utilized in the mid and long wavelength infrared because the required filter thickness for these portions of the spectrum is greater than the conventional photoresist thickness used in lithographic processes, making removal of the resist exceedingly difficult.

As a consequence of these restrictions, current infrared focal plane array technology is limited to a single wavelength band of operation for each detector array or subarray. Multicolor focal planes require separate staring arrays with individual spectral filters or are built up of individual linear array components (usually several elements in width), each associated with a different bandpass filter. Other multicolor approaches require scanning of the scene over multiple linear arrays with individual filter elements.

An improved optical thin film technology which would integrate spectral bandpass filters with an infrared focal plane array could have a major impact on future imaging and surveillance systems. New material and processing technology is needed to permit the deposition of spectral filters onto infrared arrays at ambient temperatures and to fabricate filter arrays directly on the focal plane arrays so that different regions of the same array can respond to different wavelengths. Furthermore, advanced designs and processing procedures are required to minimize the thickness of the deposited filter that must be spatially patterned to achieve the wavelength selection between adjacent pixels or focal plane segments.

SUMMARY OF THE INVENTION

The multicolor focal plane array of this invention detects and distinguishes between incoming infrared electromagnetic radiation within a first band of wavelengths and incoming infrared electromagnetic radiation within a second band of wavelengths. The first wavelength band is a subset of the second wavelength band.

This configuration accomplishes wavelength selection between two broad, widely spaced spectral bands, for example the 2-5 and the 8-12 micron infrared bands. Spectral discrimination is achieved by a differencing of the alternately filtered detectors. Radiation from thermal sources, which is predominantly in the 8-12 micron band, is detected in all detectors. Emissions from hot sources, such as engine plumes, contributes a large signature in the 2-5 micron band. When present, it is expected to overpower any 8-12 micron signal and will be present in only one subset of detectors. Specific filter designs to accomplish this wavelength discrimination require a dual optimization process. By dividing the filter roughly in half, the total coating thickness that must be lithographically patterned is significantly reduced.

The array includes a substrate and a two dimensional array of detectors disposed on the substrate and responsive to infrared electromagnetic radiation within a predetermined range of wavelengths including the first and second wavelength bands. A first thin film filter is disposed on the substrate and interposed between the incoming radiation and a subset of the detectors in the array to prevent radiation outside of the first wavelength band from reaching those detectors. A second thin film filter is disposed on the substrate and interposed between the incoming radiation and all of the detectors in the array, including the previously uncoated detectors as well as those coated with the first thin film filter. The detectors which are coated with both filters are thus made sensitive to wavelengths within the first wavelength band, while the remaining detectors, which are coated with the second filter only, are sensitive to wavelengths within both the first and second wavelength bands.

In a more particular embodiment, the first filter is fabricated of alternating layers of Ge and $CaF_2$, while the second filter is made of alternating layers of Ge and ZnS.

DESCRIPTION OF THE INVENTION

It is an outstanding feature of this invention to provide a novel technique for integrating a solid state infrared focal plane with a complex filter, thereby allowing the focal plane to discriminate incoming infrared radiation from two or more different wavelength bands within the response range of the detectors on the focal plane, with a design concept that reduces the thickness of the coating that must be lithographically patterned.

Figure 1:
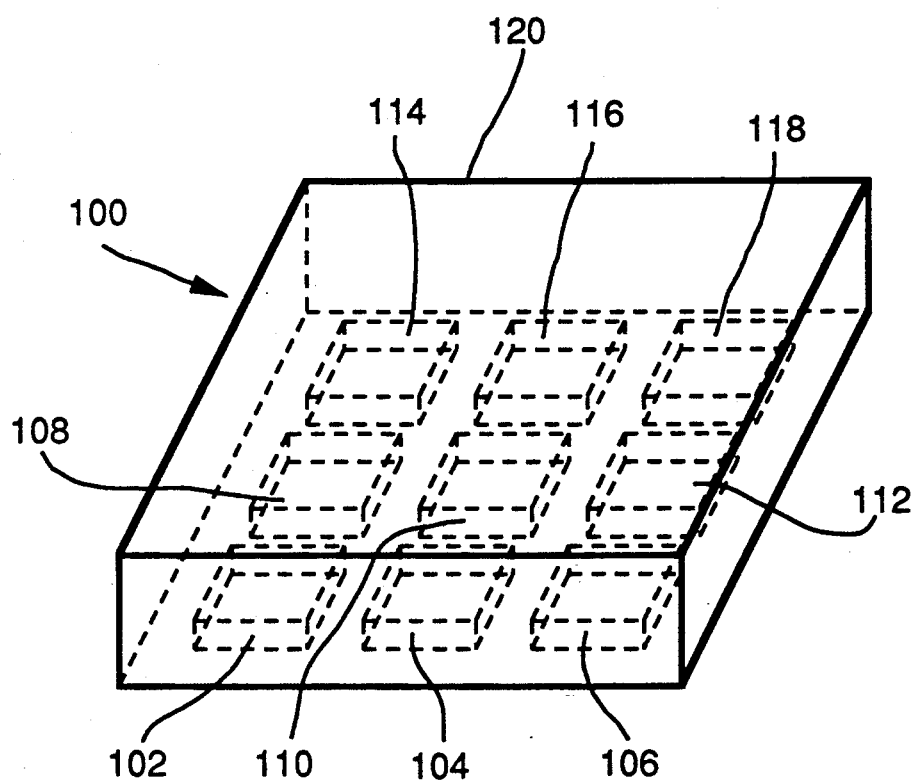
FIG. 1 is a perspective view illustrating an exemplary focal plane on which a multicolor capability can be provided according to this invention.

FIG. 1 is a perspective view illustrating an exemplary focal plane 100 on which such a multicolor capability can be provided according to this invention. The focal plane 100 includes a two dimensional array of detectors 102–118 which are fabricated in the lower surface of a substrate 120. The focal plane array is designed to be "backside illuminated", i.e., the detectors receive incoming radiation from the upper direction after such radiation passes through the substrate 120. As those skilled in the ar will appreciate, an actual focal plane would typically include a much large number of detectors, but the number is limited in the illustrative example in order to present the inventive concept more clearly. For the same reason, some of the dimensions shown in the figures are exaggerated relative to other dimensions.

Figure 2:
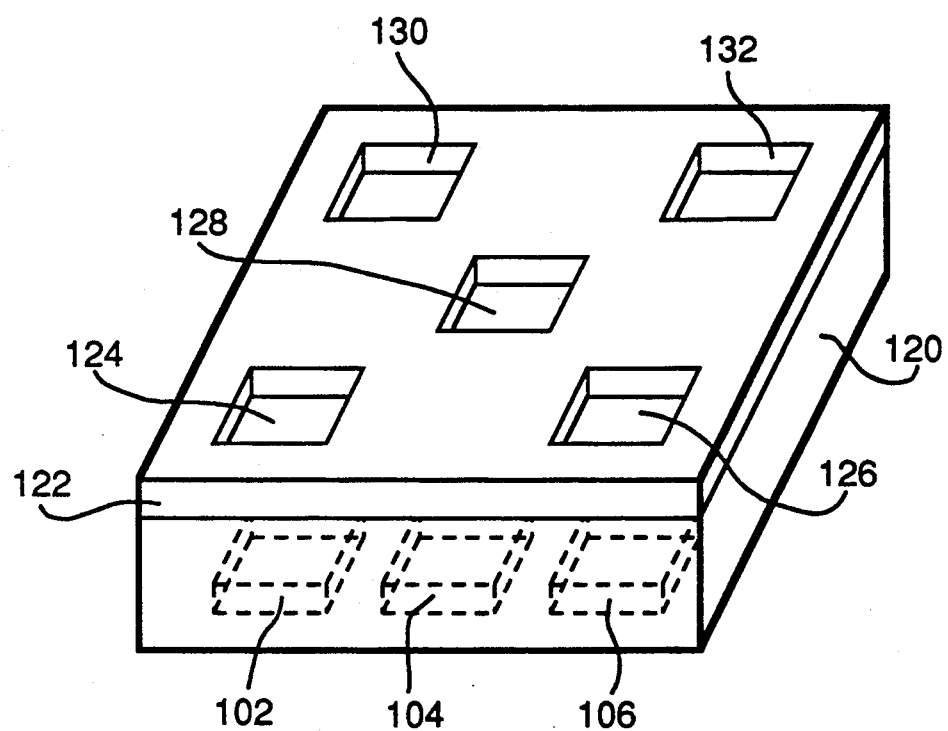
FIGS. 2-5 are perspective views similar to FIG. 1 which illustrate the steps in providing the focal plane of FIG. 1 with a multicolor capability.
Figure 3:
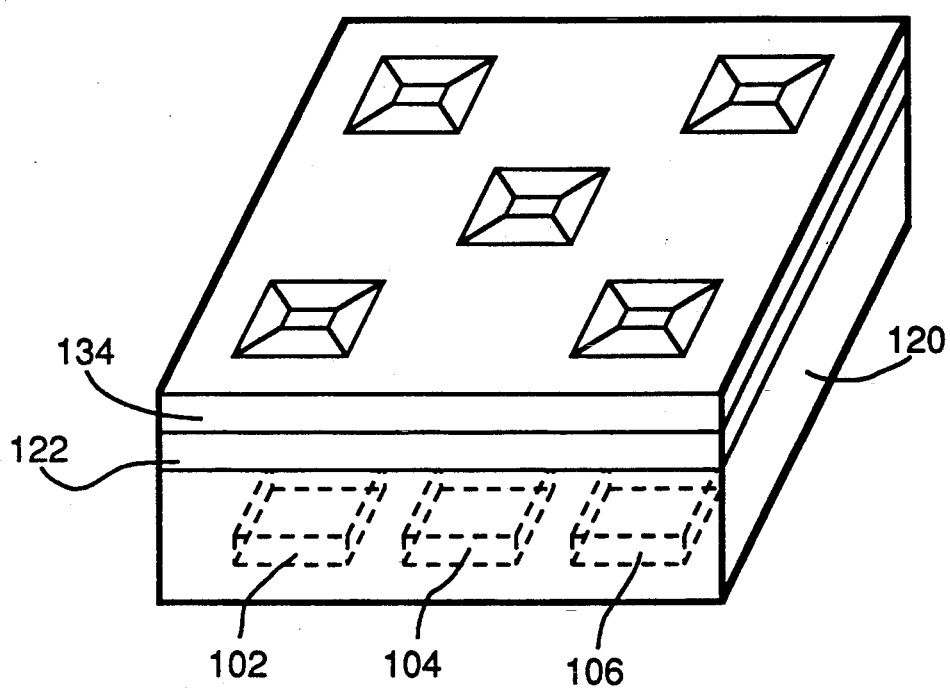
Figure 4:
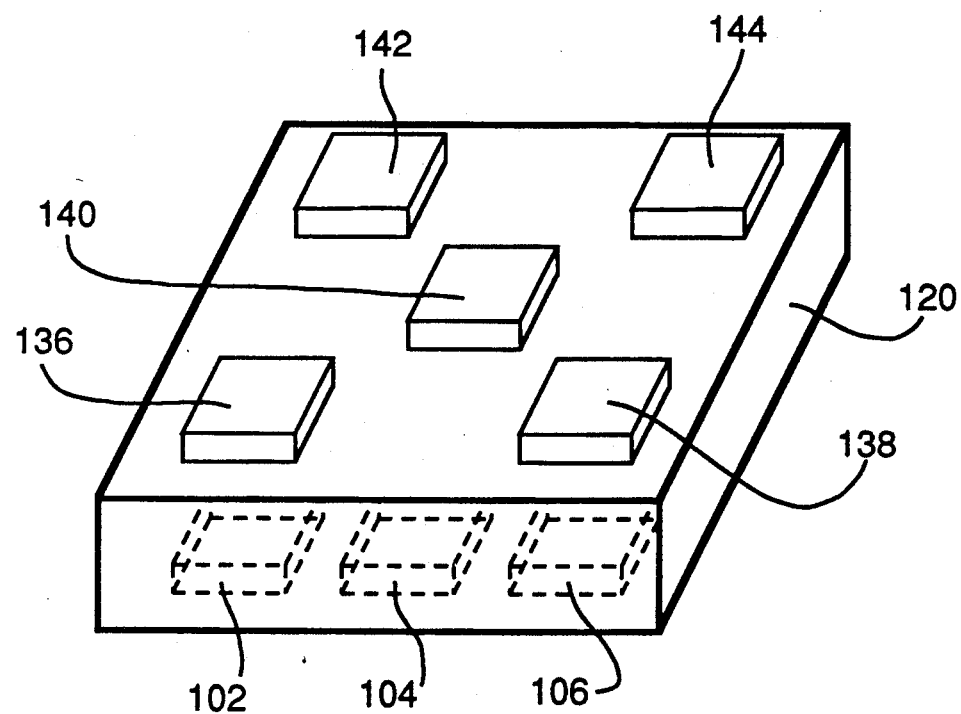

FIGS. 2–5 are perspective views similar to FIG. 1 which illustrate the steps in providing the focal plane 100 with a multicolor capability according to this invention. A first relatively thin (less than 5 microns, for example) filter layer is deposited in a pattern, either stripe or checkerboard, in order to transmit a first range of wavelengths. In the example here, this is accomplished by first depositing a layer of photoresist 122 over the back surface of the substrate 120, then selectively removing the photoresist over alternate detectors, as shown in FIG. 2. This leaves openings 124–132 over the detectors 102, 106, 110, 114, and 118, respectively. Next, as illustrated in FIG. 3, a filter layer 134 is deposited over the photoresist 122. The underlying photoresist 122 is then removed, lifting off the overlying filter layer, so that the filter layer is left only in selected areas 136–144 over the detectors 102, 106, 110, 114, and 118, respectively, as shown in FIG. 4.

Alignment of the filter array masks with the detector pattern can be readily achieved using a scanning infrared laser microscope operating at 10.6 microns to image the detector pixels. Cutouts in the mask can be positioned over selected test diodes; the reflected light signal from the metallized pixels and the induced current can be simultaneously optimized for best alignment. Because some of the filter layers which must be deposited for such a filter are relatively thick, several layers of photoresist, one on the other, must typically be used. Most structures which are lifted using photoresist technology are much thinner than the filter layers used in this invention, which can be, for example, approximately 5 microns thick. Conventional resist technology uses only a single layer of resist to lift off the undesired portion of a layer. The filter design method disclosed here reduces the thickness requiring patterning to less than five microns, enabling use of the multilayer resist approach.

Figure 5:
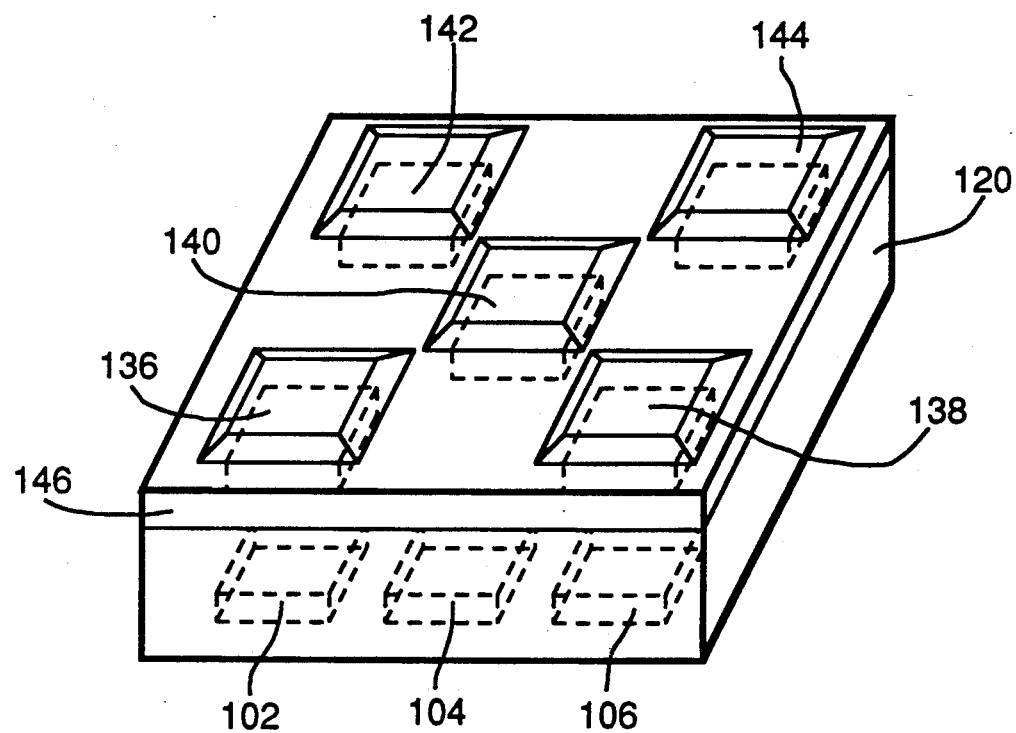

Finally, as depicted in FIG. 5, a second filter layer 146, which is designed as a dual bandpass filter, is deposited over the first filter. In this manner, the detectors 102, 106, 110, 114, and 118, which are covered by both filters, will only be exposed to radiation in the first range, while the detectors 104, 108, 112, and 116, which are covered by only the second filter layer 146, will receive radiation in both the bands. For sources of radiation where the first band radiation dominates the signal, the latter detectors will respond primarily to the first wavelength range. The intensity within each band may be derived by performing a differencing operation between the pixels within each selected group.

By depositing the filters using the design approach of this invention, the total thickness that must be lithographically patterned is reduced. This makes it possible to generate the patterned filter using established multilayer resist technology.

The filter layers are deposited on the focal plane substrate using energetic deposition approaches, such as, for example, pulsed or continuous wave laser-assisted deposition, ion-assisted deposition, or ion-sputtering, in order to prevent damage to temperature sensitive detectors by excessive heating. HgCdTe infrared detectors, for example, are extremely temperature sensitive and can be damaged by temperatures exceeding approximately 75° C. This temperature is much too low to achieve good quality thin films by conventional deposition methods. A low temperature is also essential for the process of patterning the spectral filters on the focal plane, since the temperature must be kept below approximately 120° C. to prevent the photoresist from flowing and thereby ruining the pattern.

One example of a particular filter for a multicolor focal plane array which was fabricated in the above manner according to this invention was developed as a filter for a MWIR/LWIR (medium wavelength infrared/long wavelength infrared) array. This filter was designed to allow the associated focal plane to detect radiation in the 3–5 micron and 8–12 micron wavelength bands.

Figure 6:
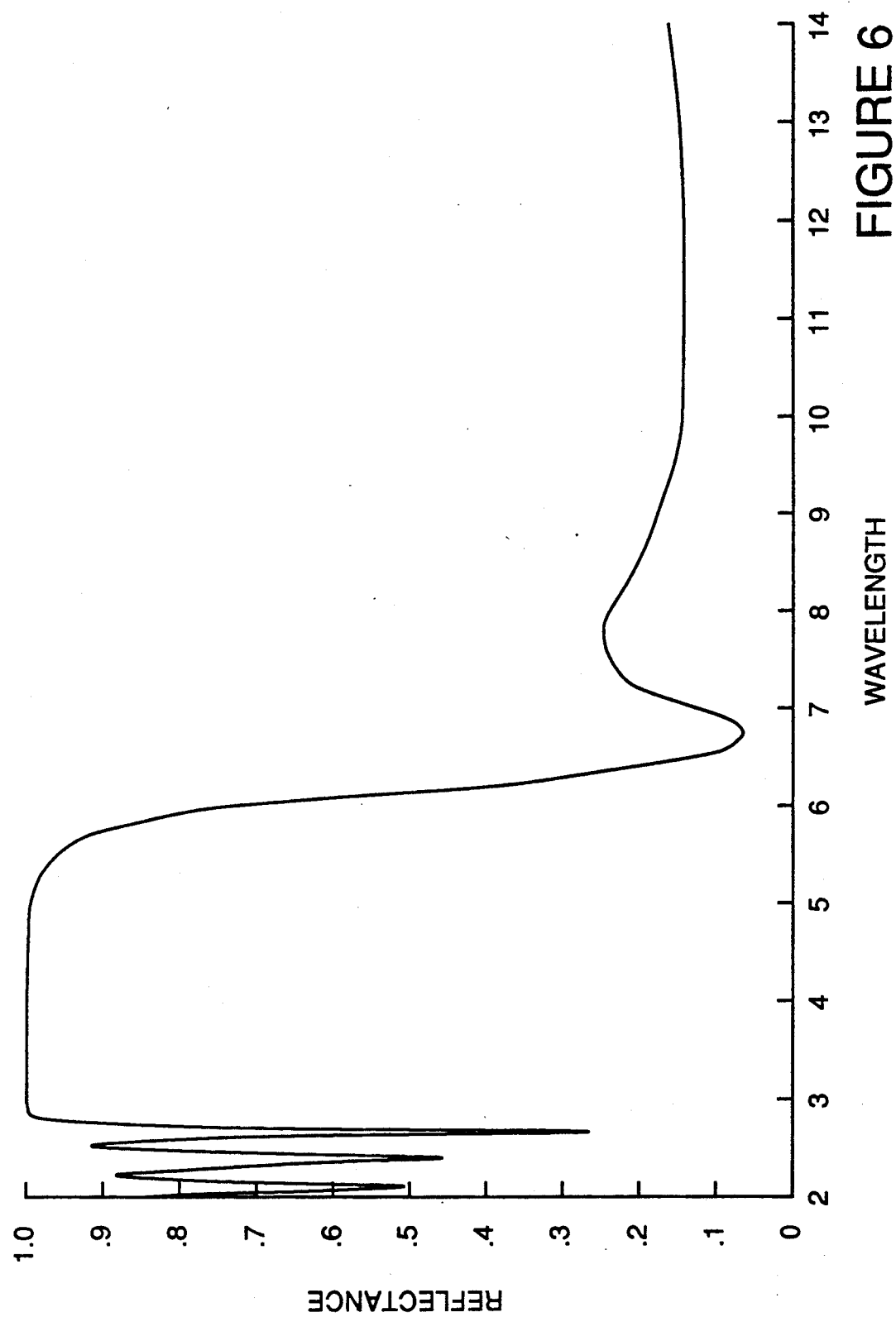
FIG. 6 is a plot of the calculated reflectance as a function of wavelength for the first filter shown in FIGS. 1-5.

The first filter, which was deposited over selected regions, was a long-wave pass design which transmitted radiation in the 8–12 micron range. This filter was made up of alternating layers of $CaF_2$ and Ge. The thickness and refractive index specifications for the individual layers within the first filter were as listed in Table I, where layer 1 is the layer nearest the substrate. A plot of the calculated reflectance as a function of wavelength for this filter is depicted in FIG. 6.

TABLE I

| Layer Number | Thickness (microns) | Refractive Index |
|---|---|---|
| 1 | .0586 | 4.06 |
| 2 | .6207 | 1.28 |
| 3 | .2344 | 4.06 |
| 4 | .7324 | 1.28 |
| 5 | .2344 | 4.06 |
| 6 | .7324 | 1.28 |
| 7 | .2344 | 4.06 |
| 8 | .7324 | 1.28 |
| 9 | .2395 | 4.06 |
| 10 | .3116 | 1.28 |

The second filter, which was deposited over the entire surface, was a dual-pass design made of alternating layers of ZnS and Ge and designed to pass radiation in both the 3–5 micron and 8–12 micron wavelength ranges. The thickness and refractive index specifications for the individual layers within the second filter were as listed in Table II. A plot of the calculated reflectance as a function of wavelength for this filter is depicted in FIG. 7.

TABLE II

| Layer Number | Thickness (microns) | Refractive Index |
| --- | --- | --- |
| 1 | .0500 | 4.06 |
| 2 | 1.2032 | 2.15 |
| 3 | .3991 | 4.06 |
| 4 | .6833 | 2.15 |
| 5 | .3844 | 4.06 |
| 6 | .6833 | 2.15 |
| 7 | .3844 | 4.06 |
| 8 | .6833 | 2.15 |
| 9 | .3860 | 4.06 |
| 10 | .6804 | 2.15 |
| 11 | .3825 | 4.06 |

Figure 7:
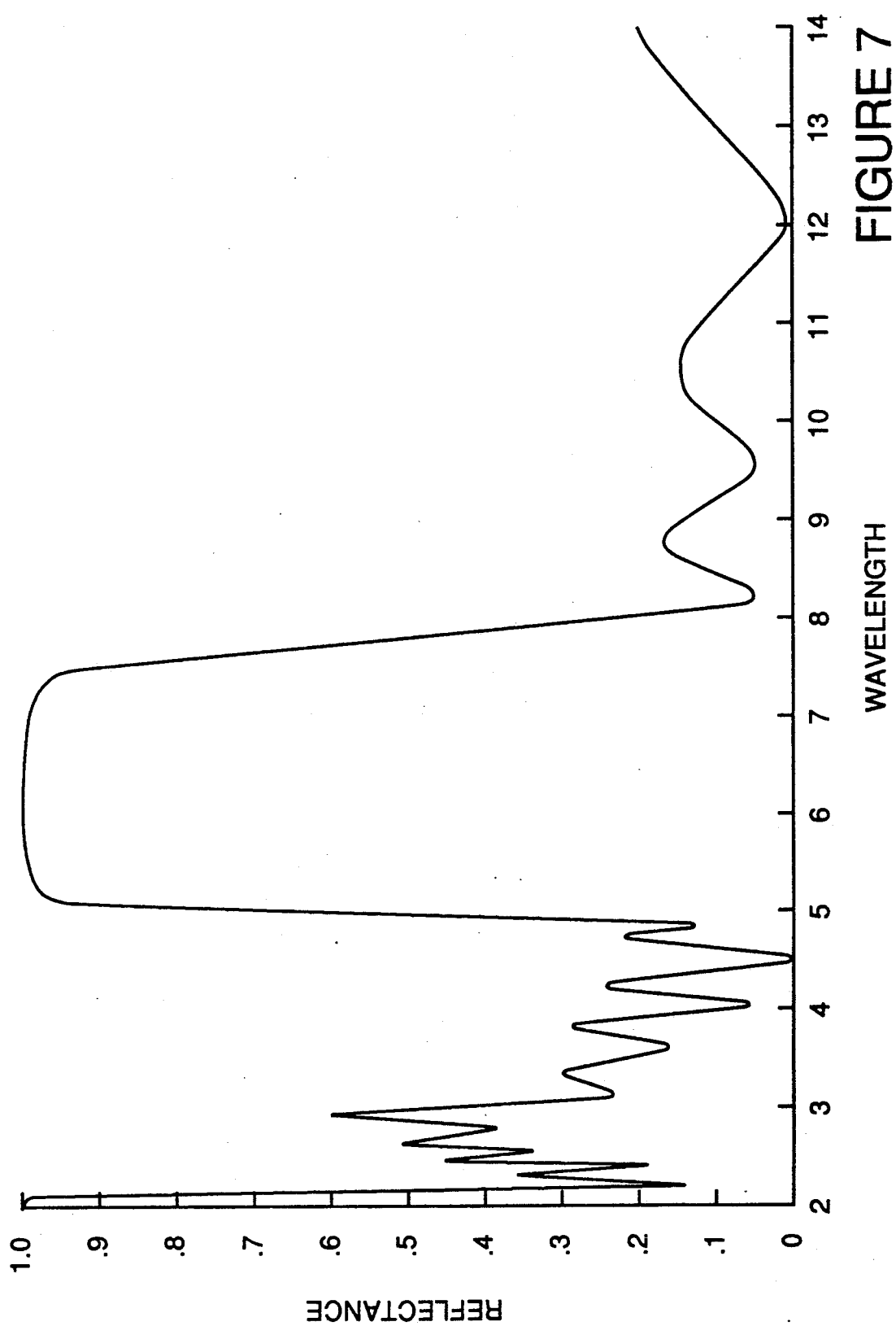
FIG. 7 is a plot of the calculated reflectance as a function of wavelength for the second filter shown in FIGS. 1-5.
Figure 8:
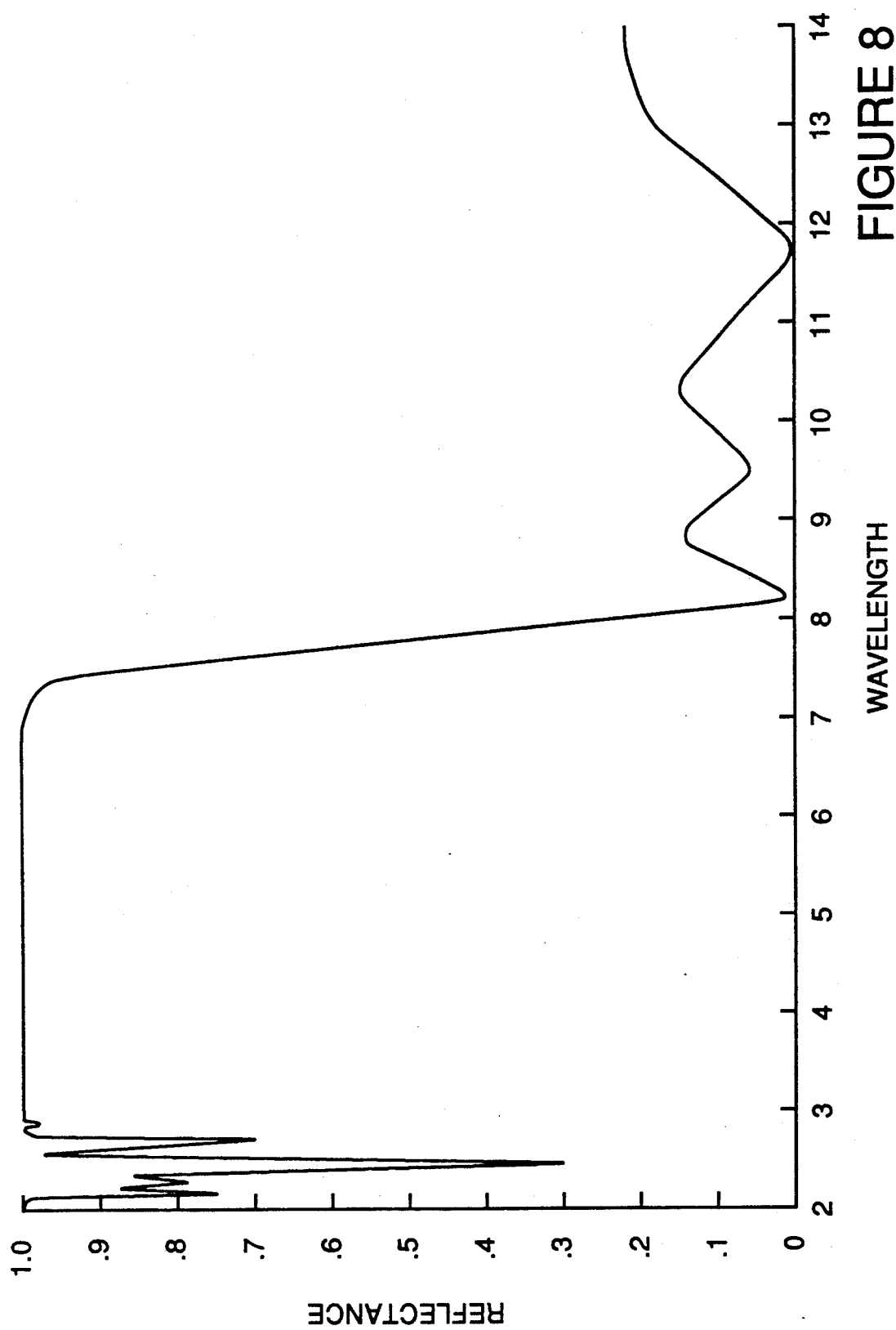
FIG. 8 is a plot of reflectance versus wavelength similar to FIGS. 6 and 7 but illustrating the performance of the two filter designs combined.

FIG. 8 is a plot of reflectance versus wavelength similar to FIGS. 6 and 7 but illustrating the performance of the two filter designs combined. One of the advantages of these filter designs is that the thin layers of Ge, $CaF_2$, and ZnS can be deposited without the necessity of heating the substrate. This series of layers was successfully deposited on a CdTe substrate, thereby demonstrating the compatibility of the lithographic process with the multilayer optical coating structure.

The preferred embodiments of this invention have been illustrated and described above. Modifications and additional embodiments, however, will undoubtedly be apparent to those skilled in the art. Furthermore, equivalent elements may be substituted for those illustrated and described herein, pars or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. A multicolor focal plane array for detecting and distinguishing between incoming electromagnetic radiation within a first band of wavelengths and incoming electromagnetic radiation within a second band of wavelengths which includes the first wavelength band, comprising:

a substrate;

a two dimensional array of detectors disposed on the substrate and responsive to electromagnetic radiation within a predetermined range of wavelengths including the first and second wavelength bands;

a first thin film filter disposed on the substrate and interposed between the incoming radiation and a subset of the detectors in the array to prevent radiation outside of the first wavelength band from reaching the detectors; and a second thin film filter disposed on the substrate and interposed between the incoming radiation and all of the detectors in the array;

thereby rendering the detectors in the subset sensitive to radiation within the first wavelength band and the remaining detectors sensitive to radiation within both the first and second wavelength bands.

2. The array of claim 1, wherein the first filter further comprises alternating layers of Ge and $CaF_2$ and the second filter further comprises alternating layers of Ge and ZnS.

3. A method of making a multicolor focal plane array for detecting and distinguishing between incoming electromagnetic radiation within a first band of wavelengths and incoming electromagnetic radiation within a second band of wavelengths which includes the first wavelength band, comprising the steps of:

providing a substrate;

fabricating on the substrate a two dimensional array of detectors which are responsive to electromagnetic radiation within a predetermined range of wavelengths including the first and second wavelength bands;

depositing a multilayer resist pattern on the substrate over the detector array;

depositing a first thin film filter on the substrate over the multilayer resist pattern;

lifting off the resist and portions of the first filter to leave the first filter interposed between the incoming radiation and a subset of the detectors in the array, thereby preventing radiation outside of the first wavelength band from reaching the detectors in the subset; and depositing a second thin film filter on the substrate over the first filter and interposed between the incoming radiation and all of the detectors in the array, thereby rendering the detectors in the subset sensitive to radiation within the first wavelength band and the remaining detectors sensitive to radiation within both the first and second wavelength bands.

4. A method of claim 3, wherein the step of depositing a first thin film filter further comprises the step of:

depositing alternating layers of Ge and $CaF_2$ on the substrate;

and wherein the step of depositing a second thin film filter further comprises the step of:

depositing alternating layers of Ge and ZnS on the substrate.

* * * * *